United States Patent [19]
Ammann

[11] Patent Number: 4,857,357
[45] Date of Patent: Aug. 15, 1989

[54] SOYA FOOD PRODUCT AND PROCESS

[75] Inventor: Ulrich Ammann, Pfaffhausen, Switzerland

[73] Assignee: Nestec S.A., Vevey, Switzerland

[21] Appl. No.: 891,191

[22] Filed: Jul. 28, 1986

[30] Foreign Application Priority Data

Jul. 29, 1985 [CH] Switzerland ............... 3276/85

[51] Int. Cl.⁴ ............................................... A23L 1/20
[52] U.S. Cl. ........................... 426/634; 426/457; 426/459; 426/464
[58] Field of Search ............ 426/634, 632, 629, 451, 426/457, 459, 464

[56] References Cited

U.S. PATENT DOCUMENTS

| 3,840,679 | 10/1974 | Liepa et al. | |
|---|---|---|---|
| 3,911,157 | 10/1975 | Bates | 426/459 |
| 4,001,441 | 1/1977 | Liepa | |
| 4,022,919 | 5/1977 | Comer | 426/634 X |
| 4,079,155 | 3/1978 | Kakade | 426/634 |
| 4,209,541 | 6/1980 | Clatfelter | 426/634 X |

FOREIGN PATENT DOCUMENTS

| 0041455 | 3/1985 | Japan | 426/634 |
|---|---|---|---|
| 8203750 | 11/1982 | PCT Int'l Appl. | |
| 1368402 | 9/1974 | United Kingdom | |
| 1526998 | 10/1978 | United Kingdom | |

OTHER PUBLICATIONS

Swern et al, Bailey's Industrial Oil and Fat Products, 1964, Interscience Publishers: N.Y., pp. 638-639.

Primary Examiner—Joseph Golian
Attorney, Agent, or Firm—Vogt & O'Donnell

[57] ABSTRACT

Pulses or oilseeds are subjected to a first treatment with steam, ground and mixed with water to prepare a paste having a dry matter content of from 50 to 70%. The paste is shaped, subjected to a second treatment with steam, dried and cut up into individual articles before or after drying.

17 Claims, No Drawings

SOYA FOOD PRODUCT AND PROCESS

This invention relates to a process for the preparation of a food product based on vegetable proteins by forming a paste of vegetable protein material and water, cooking and drying, and to the product obtained by this process.

Various solid food products, as opposed to liquid food products, prepared from vegetable protein materials are already known. Tofu (soya cheese) and yuba (rolled leaf of coagulated soya milk), for example, are two of the traditional products originating from South East Asia, while meat substitutes, such as spun proteins or proteins textured by extrusion cooking, are among the products of relatively recent origin.

Whereas the traditional products, such as tofu and yuba, are still very popular in their countries of origin and are beginning to appear in typically western markets, spun proteins or proteins textured by extrusion cooking have not been as successful as expected for reasons of excessive cost or rejection of the concept of meat substitutes.

Other products have been developed with a view either to reducing production costs by using more simple processes and installations or to modifying the organoleptic concept of the product by not seeking to imitate meat.

Thus, one known process for the preparation of a protein-based food comprises forming a gelable paste by mixing water, a vegetable protein isolate, at least one other ingredient selected from carbohydrates and lipides, optionally other proteins, flavourings and a little gelatin, adjusting the pH of the paste to a slightly acidic value, subjecting the paste to a heat treatment to obtain a homogeneous gel and reducing its water content to 5–45%. The product thus obtained has an elastic texture and may be smoked and sold in the form of thin, transparent slices and eaten as "viande des Grisons" for example. Although this process is easy to carry out, it does involve the use of vegetable protein isolate in combination with various other ingredients.

Another known process for the preparation of a food product based on vegetable proteins, particularly soya, comprises drying a colloidal suspension of vegetable proteins and fats on a cylinder, removing a coherent film of dried colloidal suspension from the cylinder, moistening the film and either folding the film or making it into a roll so as to form a rolled and folded, moist mass or laminate several centimetres in thickness. This mass may be cooked as such or after freezing and thawing and sold in slices, for example as a meat loaf. The product thus obtained is good, original and easy to make. However, it is better eaten fresh or after deep freezing rather than after dehydration.

Another known process comprises preparing a protein paste containing a vegetable protein isolate or concentrate in admixture with egg white or lactalbumin or gelatin, kneading and forming a sheet of this paste in a rolling machine comprising two rollers turning at different speeds to exert a friction effect on the paste, cutting the sheet thus formed into strands, bundling the strands together, adding a binder and stabilizing the whole by heating. The mass thus obtained has a fibrous texture reminiscent of meat.

In another known process derived from the process just described, the same fibrous texture reminiscent of meat is obtained from the same ingredients, except that the step where the sheet of protein is cut into strands is replaced by a step in which the sheet is crimped on removal from the last roller of the rolling machine.

Yet another known process derived from the two processes just described comprises preparing a paste by mixing water and defatted soya flakes optionally reduced to flour or meal by grinding, rolling the paste thus formed into a very thin sheet between the rollers of a rolling machine turning at different speeds to exert a strong friction effect on the sheet, cooking the sheet in wet steam, drying the sheet and then reducing it to flakes by grinding. The reconstituted flakes have a chewing-resistant texture comparable with that of meat and may be used to replace some of the minced meat used in the making of hamburgers, for example.

Finally, another known process comprises preparing a paste by mixing water and flakes, flour or meal of defatted soya, forming a sheet or strand from this paste by extrusion or rolling under mild conditions, i.e., under conditions where no friction effects are exerted on the paste, cutting the sheet or strand into individual articles, cooking the articles in the presence of a coagulating agent for proteins, namely in the presence of an acid or an alkaline earth metal salt, and drying the articles. The rehydrated articles have a texture and appearance reminiscent of meat.

The object of the present invention is to provide a process for the preparation of a food product based on vegetable proteins which, without any longer resorting to the onerous and delicate techniques of spinning or extrusion cooking and without involving the use of a chemical coagulating agent, makes it possible to obtain from a whole vegetable protein material a dehydrated product which, after reconstitution, has a natural colour, an agreeable flavour and an original texture which are not reminiscent of meat, but are attractive in themselves.

To this end, the process according to the invention is characterized in that pulses or oilseeds are subjected to a first treatment with steam, ground, mixed with water to prepare a paste having a dry matter content of from 50 to 70% by weight. The paste is shaped, subjected to a second treatment with steam, dried and cut into individual articles before or after drying.

It has been found that it is possible in this way to prepare a dehydrated product which, after reconstitution, has a colour similar to the natural colour of the pulses or oilseeds used, an agreeable flavour similar in particular to that of hazelnuts and a tender and firm original texture midway between that of whole cooked potatoes and that of pasta cooked al dente.

The product obtained by the process according to the invention is, in particular, characterized in that, after cooking for 5 to 10 minutes in water containing 4 g sodium chloride per litre, said articles have a water content of from 55 to 60% by weight and a compressive strength of 300 to 550 N.

In the context of the invention, the expression "texture midway between that of whole cooked potatoes and that of pasta cooked al dente" signifies a resistance to chewing and a consistency in the mouth, situated in a region defined at the end of lower resistance, and more pasty consistency by potatoes cooked whole in water or with steam for just the time necessary for their flesh to become tender and lose the taste of raw starch without at the same time disintegrating, and at the end of greater resistance, and less pasty consistency by pasta cooked in water for just the time necessary for it to lose the taste of raw flour while at the same time remaining firm.

Similarly, the expression "a compressive strength of so many N" signifies a resistance to chewing and a consistency in the mouth which may be determined by means of a suitable apparatus which measures the force required to press a sample of the cooked product through a perforated plate. The precise conditions under which compressive strength is determined are set out hereinafter just before the Examples.

The process according to the invention may be carried out using any of various pulses or oilseeds, such as, for example, soya beans, kidney beans, yellow peas, cottonseeds or peanut seeds. They are preferably used after dehulling or deskinning so as to obtain a product having a purer colour and a smoother texture.

The first said steam treatment of these seeds may be carried out using a saturated or slightly superheated steam at temperatures of the order of 100° to 130° C. under pressures between atmospheric pressure and approximately 3 bar, for example. This first steam treatment has a determining effect on the texture and flavour of the reconstituted end product and should preferably last from 30 s to 15 mins. If the first treatment lasts less than 30 s, the reconstituted end product may have a leathery as opposed to tender and firm texture and an unpleasant flavour. If the first treatment lasts longer than 15 mins., the reconstituted end product may have a rough and sandy, as opposed to a smooth and homogeneous, texture and a lack of colour.

Accordingly, the seeds are ground after this first steam treatment. The fineness of this grinding step does not have a significant effect upon the texture of the reconstituted end product. However, if the grinding is too coarse and if the seed particles obtained have a mean diameter above about 1 mm, this texture is also in danger of becoming sandy. It is for this reason that the seeds are preferably ground in such a way as to obtain particles of which at least 97% by weight, based on ground seeds, have a mean diameter below 0.3 mm and at most, 20% have a mean diameter below 0.05 mm. However, the seeds may also be ground in such a way as to obtain a semolina or a flour, for example.

The ground seeds are then mixed with water to prepare a paste having a dry matter content of from 50 to 70%. Dry matter contents below 50% and above 70% also have an unfavourable effect upon the texture and colour of the reconstituted end product. A dry matter content below 50% gives a more leathery or coarser texture, depending on how the pasta is subsequently formed. A dry matter content above 70% give a more sandy texture. This mixing step is preferably carried out vigorously for a relatively short time, of from about 5 to 60 s, sufficient to obtain a homogeneous paste which may be worked without spoiling its texture and without any risk of developing undesirable tastes, odour or colours. Although not a preferred option, it is also possible to add to the paste, during mixing, flavours, flavour enhancers, vitamins, colourants or antioxidants, for example, the sum of these additives representing no more than a few percent of the weight of a paste.

The paste may then be shaped by rolling or extrusion for example, preferably under mild conditions, i.e., under conditions where friction effects on the paste are avoided as far as possible. If the paste is shaped by rolling, it is possible for example to use a rolling machine comprising two rollers rotating in opposite directions and in synchronism, i.e., at the same peripheral speed. It is possible to apply to the rollers a linear pressure, i.e., a pressure per unit length of the rollers, of from about 5 to $1500 \times 10^3$ N/m. This linear pressure and the water content of the paste have an effect upon the thickness of the rolled sheet of paste obtained. For the same roller gap, an increase in this linear pressure or a reduction in this water content results in a reduction in the thickness of the sheet. Providing both the pressure and the water content remain within the ranges indicated, these variations in thickness will have no adverse effect upon the texture of the reconstituted end product. Thus, the paste may preferably be rolled to a thickness of approximately 0.8 to 1.5 mm where it is to be subsequently cut up into individual articles in the form of flakes or noodles, or to a thickness of approximately 2.5 to 5.0 mm where it is to be subsequently cut into articles in the form of squat strands of square cross-section, for example.

If the paste is shaped by extrusion, it is preferred to use extrusion dies having relatively large individual openings and a relatively large total open area so that there is no need to apply excessive extrusion pressures. Thus, the paste is preferably extruded under a pressure of from about 2 to 20 bar.

The second steam treatment of this shaped paste may also be carried out using a saturated or slightly superheated steam at temperatures on the order of 100° to 130° C. under pressures between atmospheric pressure and approximatley 3 bar, for example. This second steam treatment also has a determining effect upon the texture and flavour of the reconstituted end product and should preferably last 30 s to 15 mins. If the second treatment lasts less than 30 s and if the first treatment lasts less than 30 s, the reconstituted end product may have a leathery texture and an unpleasant flavour. If the second treatment lasts less than 30 s and the first treatment 30 s to 15 mins., the reconstituted end product may have an overly soft texture or inadequate cohesion. If the second treatment lasts longer than 15 mins., the reconstituted end product may lose its organoleptic quality. However, the sum of the two treatments is preferably equal to at least 10 mins. in order sufficiently to eliminate the antitrypsin factor. The formed paste is then dried before or after being cut up into individual articles. This drying may be carried out with hot air at moderate temperature and at atmospheric pressure, for example. Thus, the paste is preferably dried with hot air at approximately 70° to 90° C. for 1 to 4 h, the time necessary for the residual water content of the paste to be approximately 3 to 4% by weight.

Finally, the formed paste is cut up into individual articles before or after drying, depending on the form to be given to said articles. To obtain articles in the form of noodles, for example, flat strands obtained by extrusion or by cutting from a sheet itself obtained by rolling are preferably cut to the desired length before drying. Shorter articles in the form of squat strands of square cross-section, for example, may be similarly obtained. To obtain articles in the form of flakes, for example, a rolled sheet may be cut up or broken into pieces after drying. Finally, to obtain articles of more complex forms, such as shells, for example, the paste may again be cut up before drying just after formation of the shells by extrusion through a suitable die.

The end product obtained by the process according to the invention is thus in the form of dehydrated individual articles which, after cooking for 5 to 10 mins. in water containing 4 g sodium chloride per liter, have a water content of from 50 to 67% by weight and a compressive strength of from 300 to 550 N. The reconstituted end product complying with this definition effectively has a texture midway between that of whole cooked potatoes and that of pasta cooked al dente. If the product has a compressive strength below 300 N, it is too soft and is in danger of disintegrating. If it has a compressive strength above 550 N, it is too leathery and has a texture more reminiscent of fragments of meat than of pasta cooked al dente.

When said articles are in the form of noodles or flakes, their thickness is preferably between about 0.7 and 1.4 mm in the dehydrated state and between about 1.0 and 2.0 mm after rehydration. A thinner product is in danger, in particular, of having an overly leathery texture after rehydration. A thicker product is possible, although it is preferred in that case to present the product in the form of different individual articles, such as short strip segments of square cross-section, for example.

The product according to the invention rehydrated by cooking for 5 to 10 mins. in water containing 4 g sodium chloride per litre thus has a tender and firm original texture, an agreeable flavour and a colour similar to the natural colour of the pulses or oilseeds used for its preparation. It may be consumed as such with butter, in salads or as a garnish for soups, thinly sliced in a sauce or sauted in a pan, for example. It may be consumed on its own or as an accompaniment to vegetables or meat, for example.

Some of the following Examples are given to illustrate the invention and others are Comparison Examples. The percentages in these Examples are percentages by weight.

In the Examples, the compressive strength and, where applicable, the colour of the products described are determined by the following respective procedures:

Determination of compressive strength 40 g of dehydrated product are immersed and left for 5 to 10 mins. in 400 ml boiling water containing 1.6 g sodium chloride. This sample of rehydrated product is drained and placed in a parallelepipedic measuring cell open on top and having a base formed by a 50 cm$^2$ square plate drilled with 94 holes 6 mm in diameter.

By means of a sliding piston of square cross-section descending through the cell at a rate of 8.3 mm/s, the sample of reconstituted product is forced through the perforated plate while, at the same time, the curve of the force applied to the piston as a function of the distance travelled is automatically recorded on graph paper. The curve shows two approximately linear sections of which the first corresponds to a compression of the sample before it begins to pass through the plate while the second corresponds to the pressing of the sample through the plate. The intersection of the straight lines corresponding to these two curve sections is considered as defining the minimum force to be applied to the sample to press it through the plate. The compressive strength is defined as being equal to that minimal force.

Determination of colour

A sample of product is prepared by reducing it either to a flour, of which all the particles are smaller than 0.2 mm in diameter, or to a semolina of which the average particle diameter is between about 0.2 and 0.5 mm. A 2 cm thick layer is formed in a metal tube having a flat base of transparent, colourless glass. Light of type C of the ILC (International Lighting Commission), i.e., light corresponding to the mean light of daytime having a colour temperature of 6774° K., is directed onto the outer surface of the tube base at an angle of 45°. By means of three detectors fitted with red, green and blue filters, the three components X, Y and Z (under the ILC system) of the colour of the light reflected by the sample are detected perpendicularly to the surface of the sample. The Lab values and the saturation C of the colour of the sample are determined with the aid of these trichromatic components, the respective definitions of these values being: $L=10.0\sqrt{Y}$, $a=17.5(1.02 X-Y)/\sqrt{Y}$, $b=7.0(Y-0.847Z)/\sqrt{Y}$ and $C=\sqrt{a^2+b^2}$. In this Lab system, the values thus determined are recorded in a three-dimensional coordinate system in which the vertical axis is the axis of the luminosity L, the abscissa "a" leads from green (negative values a) to red (positive values a) from the ordinate "b" goes from blue (negative values b) to yellow (positive values b).

One and the same sample is placed in the cell, measured, removed from the cell, replaced in the cell and remeasured 5 times in succession. The arithmetic mean of the Lab and C values thus determined is then taken.

Comparison Example (i)

While potatoes are cooked in salt water for just the time necessary for their flesh to become tender and to lose the taste of raw starch without at the same time disintegrating. Then they have a water content of 78%. The compressive strength of a sample of 100 g of these whole cooked potatoes is determined using the same cell and under the same conditions as described above. A value of 293 N is observed.

Comparison Example (ii)

Pasta prepared from hard wheat semolina and eggs is cooked in salt water for just the time necessary for it to lose the taste of raw flour while, at the same time, remaining firm; in other words, for the pasta to be al dente. The pasta then has a water content of 62%. The compressive strength of a sample of 100 g of this pasta cooked al dente is then determined using the same cell and under the same conditions as described above. A value of 533 N is observed.

EXAMPLE 1

Deskinned soya beans from the USA are treated for 4 minutes with saturated steam at atmospheric pressure at 100° C. The soya beans thus treated are then ground in a hammer mill to obtain particles of which the mean diameter shows the following distribution, expressed in % by weight of ground beans:

| Mean diameter mm | Proportion % |
| --- | --- |
| above 0.315 | 2.4 |
| 0.25 | 3.6 |
| 0.20 | 4.4 |
| 0.15 | 8.0 |
| 0.10 | 12.8 |
| 0.075 | 14.8 |
| 0.05 | 34.0 |
| below 0.05 | 20.0 |

The ground beans are vigorously mixed or stirred with water for 50 s in a quantity of 550 g of water per kg of ground beans which themselves have a dry matter content of 91%. A workable paste having a dry matter content of 59% is obtained. The paste is shaped by rolling under a linear pressure of 500×10³ N/m in a rolling machine comprising two parallel rollers 15 cm in diameter. The gap between the rollers is 0.4 mm. The rollers rotate in synchronism, but in opposite directions, at a peripheral speed of 15 cm/s.

The paste is then rolled to a thickness of 0.9 mm. The sheet thus obtained is treated for 10 minutes with saturated steam at 100° C./atmospheric pressure. After this treatment, the sheet has a dry matter content of 60%. It is dried in hot air at 80° C. for 2.5 h so that it has a residual water content of 4%. It is broken or cut into irregular flakes having a mean diameter of approximately 1–2 cm, a thickness of 0.8 mm and a yellow color similar to that of the deskinned starting beans.

After rehydration by cooking for 5 mins. in water containing 4 g salt per litre, these flakes have a thickness of 1.2 mm, a water content of 65% and a compressive strength of 338 N. Their texture is reminiscent of whole cooked potatoes, but is slightly more firm. Their colour remains similar to that of the deskinned starting beans. Their flavour is slightly reminiscent of hazelnuts and does not have any unpleasant or bitter note.

Comparison Examples (iii) to (vii) and EXAMPLE 2

(iii) The procedure is as described in Example 1, except that the first steam treatment is carried out for 20 s instead of 4 mins. The rehydrated flakes have a bitter flavour and a leathery texture.

(iv) The procedure is as described in Example 1, except that the first steam treatment is carried out for 16 mins. instead of 4 mins. The rehydrated flakes have a sandy texture and are slightly reddish in colour.

(v)–(vii) and 2 The procedure is as described in Example 1, except that each steam treatment is carried out for 0 or 10 mins. The respective durations of the heat treatments and the organoleptic qualities of the rehydrated flakes are shown in the following Table:

| Comparison Examples | Steam treatment 1st mins. | 2nd mins. | Rehydrated flakes texture | flavour |
| --- | --- | --- | --- | --- |
| (v) | 0 | 0 | leathery | unpleasant, bitter |
| (vi) | 0 | 10 | leathery | unpleasant |
| (vii) | 10 | 0 | soft | sweetish |
| Example 2 | 10 | 10 | tender and firm | relatively neutral, agreeable |

This Table clearly illustrates the importance of combining the two steam treatments to the success of the process. The two steam treatments would appear to have a complementary effect on the texture of the rehydrated end product, the first ensuring that it is sufficiently tender and the second ensuring that it is not overly tender. In addition, the first steam treatment has a decisive influence on the flavour of the end product due probably to the inactivation of enzymes triggering off irreversible reactions responsible for unpleasant and bitter flavours. Finally, it may be noted that the sum of the steam treatments plays an important nutritional role by ensuring the inactivation of the antitrypsin factor and that it also guarantees good keeping qualitites of the dehydrated end product.

EXAMPLE 3

The procedure is as described in Example 1, except that the ground beans are mixed with water in a quantity of 450 g instead of 550 g per kg of ground beans and that the workable paste obtained thus has a dry matter content of 63%. The rehydrated flakes have a texture even more similar to that of whole cooked potatoes than the rehydrated flakes of Example 1.

EXAMPLE 4

The procedure is as described in Example 1, except that the ground beans are mixed with water in a quantity of 650 g instead of 550 g per kg of ground beans and that the workable paste obtained thus has a dry matter content of 55%. The rehydrated flakes have a texture more similar to that of pasta cooked al dente than the rehydrated flakes of Example 1.

EXAMPLES 5 to 16

The procedure is as described in Example 1, except that three pastes having dry matter contents of 55, 59 and 63%, respectively, are prepared and that each paste is formed by rolling under linear pressures of 5, 40, 500 and 1000×10³ N/m. The pastes thus formed are observed, in particular, for the effect of the respective variations in their water content and in the linear pressure in the rolling machine on the thickness of the flakes in the dehydrated state and after rehydration. The values obtained are shown in the following Table:

| Example No. | Linear pressure 10³ N/m | Dry matter content of the paste % | Thickness of the flakes dehydrated mm | rehydrated mm |
| --- | --- | --- | --- | --- |
| 5 | 5 | 55 | 1.0 | 1.7 |
| 6 | 5 | 59 | 1.1 | 1.5 |
| 7 | 5 | 63 | 1.3 | 1.8 |
| 8 | 40 | 55 | 0.8 | 1.4 |
| 9 | 40 | 59 | 0.9 | 1.2 |
| 10 | 40 | 63 | 1.1 | 1.6 |
| 11 | 500 | 55 | 0.7 | 1.1 |
| 12 | 500 | 59 | 0.7 | 1.1 |
| 13 | 500 | 63 | 0.8 | 1.2 |
| 14 | 1000 | 55 | 0.7 | 1.0 |
| 15 | 1000 | 59 | 0.7 | 1.0 |
| 16 | 1000 | 63 | 0.7 | 1.1 |

This Table illustrates the fact that an increase in the linear pressure and an increase in the water content of the paste produce a reduction in the thickness of the rolled sheet of paste. The consequence of the effect of these variations in linear pressure and in the water content of the paste is that the texture of the rehydrated flakes is more akin to the texture of pasta cooked al dente, the higher the linear pressure and the lower the dry matter content of the paste, providing both values remain within the limits indicated. Conversely, the texture of the flakes is more akin to that of whole cooked potatoes, the lower the linear pressure and the higher the dry matter content of the paste within the limits indicated.

EXAMPLE 17

The procedure is as described in Example 1, except that the paste is shaped by extrusion and not by rolling. The paste is extruded under a pressure of 3 bar in a pasta extruder or press of which the die enables curved articles in the form of shells to be obtained. Well-formed and regular individual shells are cut or sliced by means of a rotary cutter on leaving the die, i.e., before drying.

The shells have a wall thickness of 1.3 mm in the dehydrated state and of 1.8 mm after rehydration by cooking for 10 minutes in water containing 4 g sodium chloride per litre. After rehydration, the shells have a water content of 59% and a compressive strength of 485 N. The tender, smooth and firm texture is reminiscent of pasta cooked al dente.

EXAMPLE 18

The procedure is as described in Example 1, except that the rolled sheet of paste is cut into 6 mm wide noodles before drying. The colour of the rehydrated noodles is similar to that of the rehydrated flakes of Example 1. The texture of the rehydrated noodles is midway between that of whole cooked potatoes and that of pasta cooked al dente.

EXAMPLE 19

Deskinned soya beans from the USA are treated for 4 minutes with saturated steam at atmospheric pressure/100° C. The soya beans thus treated are then ground into flour. They are vigorously mixed with water for 50 s in a quantity of 29% of water and 71% of ground beans which themselves have a dry matter content of 92%. A workable paste having a dry matter content of 65% is obtained. The paste is formed by rolling under a linear pressure of $1200 \times 10^3$ N/m in a rolling machine comprising two parallel rollers 15 cm in diameter. The gap between the rollers is 0.4 mm. The rollers rotate in synchronism in opposite directions at a peripheral speed of 15 cm/s.

The paste is then rolled to a thickness of 0.9 mm. The sheet obtained is cut into 6 mm wide noodles. These noodles are treated for 10 minutes in an autoclave with steam superheated to 115° C. (this steam being saturated at 100° C.) at atmospheric pressure. The noodles are then dried for 2 h in hot air at 87° C. Dehydrated soya noodles having a residual water content of 3.5%, a thickness of 0.85 mm and a yellow colour similar to that of the deskinned starting beans are obtained.

After rehydration by cooking for 5 mins. in water containing 4 g sodium chloride per l, these noodles have a thickness of 1.2 mm, a water content of 63% and a compressive strength of 520 N. Their texture is reminiscent of pasta cooked al dente. Their natural yellow color remains similar to that of the deskinned starting beans. Their agreeable and relatively neutral flavour is slightly reminiscent of hazelnuts and, in particular, does not have any bitterness.

EXAMPLE 20

The procedure is as described in Example 19 except that 5% of the 71% of ground beans is replaced by a flavouring agent based on vegetable protein hydrolyzate and sodium glutamate. These rehydrated noodles differ only in colour and flavour from the rehydrated noodles of Example 19. Their colour is brownish yellow and their flavour is reminiscent of a meat bouillon.

EXAMPLE 21

The procedure is as described in Example 19, except that Canadian beans are used instead of beans from the USA. The rehydrated noodles obtained show hardly any difference from the rehydrated noodles of Example 19 except that their yellow colour is slightly lighter. This slight difference in colour faithfully reflects that shown by the starting beans.

EXAMPLE 22

The procedure is as described in Example 1, except that, instead of preparing flakes, the paste is formed by rolling into a 3 mm thick sheet which is cut up into squat strands of square cross-section and 5 cm in length. The rehydrated squat strands have a texture midway between that of whole cooked potatoes and that of pasta cooked al dente.

Comparison Example (viii)

A paste having a dry matter content of 67.5% is prepared by mixing 29% of water and 71% of defatted commercial soya flour itself containing 5% residual water. This paste is shaped by rolling with friction between two 30 cm diameter rollers separated by a 0.15 mm gap and rotating in opposite directions at different peripheral speeds, their ratio being 1:1.14. A 1.3 mm thick sheet is obtained. This sheet is cut into 6 mm wide noodles which are dried for 2 h at 87° C. Dehydrated soya noodles 1 mm thick and containing 3.5% residual water are obtained.

After rehydration by cooking for 5 mins. in water containing 4 g sodium chloride per liter, these noodles have a thickness of 1.9 mm, a water content of 59%, a compressive strength of 748 N, a brownish-grey color, a slightly bitter flavour and a leathery texture.

Comparison Example (ix)

The procedure is as described in Comparison Example (viii), except that 5% of the 71% of defatted soya flour is replaced by a flavouring agent based on vegetable protein hydrolyzate.

Noodles are obtained which have a thickness of 1.0 mm in their dehydrated state and a thickness of 1.6 mm after rehydration, a water content of 62%, a compressive strength of 645 N, a brownish-grey color, a flavour reminiscent of a meat bouillon and a leathery texture.

Comparison Example (x)

The procedure is as described in Example 20, except that the 66% of ground beans are replaced by commercial defatted soya flour.

After rehydration, the soya noodles thus obtained have a water content of 59%, a compressive strength of 715 N, a brownish-grey colour, a flavour reminiscent of a meat bouillon and a leathery texture.

Comparison Example (xi)

The procedure is as described in Example 19, except that the soya beans are not treated with steam before grinding or milling into flour.

After rehydration, the soya noodles thus obtained have a water content of 59%, a compressive strength of 770 N, a yellowish colour, an unpleasant flavour and a leathery texture.

Comparison Example (xii)

The procedure is as described in Comparison Example (xi), except that 5% of the 71% of ground soya beans not treated with steam are replaced by a flavouring agent based on vegetable protein hydrolyzate and sodium glutamate.

After rehydration, the soya noodles thus obtained have a water content of 55%, a compressive strength of 675 N, a brownish-yellow colour, a flavour reminiscent of a meat bouillon and a leathery texture.

Colour of the starting material and of various products illustrated

The components Lab and the saturation C of the colour of the various starting materials and various dehydrated products illustrated in the above Examples are determined after reduction of these starting materials and products either into flour or into semolina.

The results are set out in the following Table:

| Samples reduced into semolina | Components Lab | | | Saturation |
|---|---|---|---|---|
| | L | a | b | C |
| Pasta of hard wheat semolina of Comp. Ex. (ii) | 79.1 | −1.2 | 27.0 | 27.0 |
| Deskinned soya beans from the USA | 74.1 | −0.4 | 29.0 | 29.0 |
| Soya flakes of Example 1 | 72.5 | −0.6 | 29.0 | 29.0 |
| Soya shells of Example 17 | 71.0 | −0.5 | 29.0 | 29.0 |
| Soya noodles of Example 19 | 72.5 | −1.0 | 28.7 | 28.8 |
| Squat soya strands of Example 22 | 71.1 | 0.1 | 28.4 | 28.4 |
| Deskinned soya beans from Canada | 77.2 | −2.0 | 29.7 | 29.8 |
| Soya flakes of Example 21 | 73.5 | −1.1 | 29.5 | 29.5 |
| Soya flakes of Comp. Ex. (x) | 62.7 | 2.2 | 23.2 | 23.3 |

| Samples reduced into flour | Components | | | Saturation |
|---|---|---|---|---|
| | L | a | b | C |
| Deskinned soya beans from the USA | 85.5 | −3.1 | 20.7 | 20.9 |
| Deskinned soya beans from Canada | 87.4 | −4.2 | 20.9 | 21.3 |
| Commercial defatted soya flour | 84.4 | −1.6 | 13.0 | 13.1 |

This Table illustrates the fact that the products obtained by the process according to the invention have a natural colour similar to that of the starting material used. The colour of the flakes, shells, noodles and squat strands of Examples 1, 17, 19 and 22 shows the same tone, the same saturation and a luminosity almost as high as that of the deskinned soya beans from the USA.

The colour of the present products may be qualified as light yellow and is very similar to that of commercial pasta prepared from hard wheat semolina and eggs.

The colour of the flakes of Example 21 shows a slightly higher luminosity that that of the flakes of Example 1. This clearly reflects the fact that the colour of the soya beans from Canada has a slightly higher luminosity than that of the American beans.

The colour of the flakes of Comparison Example (x) is distinguished from that of the present products by a lower luminosity, a redder tone and lower saturation. This colour may be qualified as brownish yellow. The colour of the defatted soya flour is itself distinguished from that of the deskinned soya beans from the USA or from Canada by a slightly lower luminosity and a distinctly lower saturation.

I claim:

1. A process for the preparation of a soya food product comprising treating soya beans with steam for from 30s to 15 min at from 100° C. to 130° C., grinding the steam treated beans to a particle size having a mean diameter below about 1 mm, mixing the ground beans with water to form a paste having a dry matter content of from 50% to 70% by weight, shaping the paste by a means selected from the group of rolling and extrusion under conditions substantially avoiding friction effects on the paste wherein rolling is effected between rollers under linear pressure of from about 5 to $1500 \times 10^3$ N/m and wherein extrusion is effected under a pressure of from about 2 to 20 bar, treating the shaped paste with steam for 30s to 15 min at from 100° C. to 130° C. and then drying the steam treated shaped pasta in hot air.

2. A process as claimed in claim 1 wherein the beans are dehulled prior to treating the beans with steam.

3. A process as claimed in claim 1 wherein the total time of the steam treatments of the beans and the shaped paste is at least 10 mins.

4. A process as claimed in claim 1 wherein the particle size of the ground beans is such that at least 97% by weight of the ground beans have a mean diameter below 0.3 mm and at most, 20% have a mean diameter below 0.05 mm.

5. A process as claimed in claim 1 wherein the paste is rolled to a thickness of from about 0.8 mm to 5 mm.

6. A process as claimed in claim 1 wherein the paste is rolled to a thickness of from about 0.8 mm to 1.5 mm.

7. A process as claimed in claim 1 wherein the paste is rolled to a thickness of from about 2.5 mm to 5 mm.

8. A process as claimed in claim 1 further comprising cutting the steam treated shaped paste and then drying the cut shaped paste.

9. A process as claimed in claim 1 further comprising cutting the dried shaped paste.

10. A process as claimed in claim 1 wherein the hot air is at a temperature of from about 70° C. to 90° C. and the steam treated shaped paste is dried for from 1 h to 4 h.

11. A process as claimed in claim 1 wherein the steamed treated shaped paste is dried to a residual moisture content of about 3% to 4% by weight.

12. The product of the process of claim 1.

13. The product of the process of claim 3.

14. The product of claim 31 wherein the product is in pieces having a thickness of from about 0.7 mm to 1.4 mm in its dehydrated state.

15. The product of claim 12 wherein the product has a moisture content of from about 3% to 4% by weight in its dehydrated state.

16. The product of claim 12 wherein after cooking for from 5 mins to 10 mins in water containing 4 g sodium chloride per liter, the product has a water content of from 50% to 67% by weight and a compressive strength of from 300 N to 500 N.

17. The product of claim 16 wherein the product is in pieces and after cooking, the pieces have a thickness of from 1.0 mm to 2.0 mm.

* * * * *

UNITED STATES PATENT AND TRADEMARK OFFICE
CERTIFICATE OF CORRECTION

PATENT NO. : 4,857,357

DATED : August 15, 1989

INVENTOR(S) : Ulrich AMMANN

It is certified that error appears in the above-identified patent and that said Letters Patent is hereby corrected as shown below:

Column 12, line 18, (line 10 of claim 1), "pasta" should read --paste--.

Column 12, line 49, (line 1 of claim 14), "31" should read --12--.

Signed and Sealed this

Twenty-ninth Day of May, 1990

Attest:

HARRY F. MANBECK, JR.

Attesting Officer      Commissioner of Patents and Trademarks